United States Patent Office 2,796,348
Patented June 18, 1957

2,796,348
FOOD PRODUCT

Frank P. Colten, Roxbury, and Harry R. Di Pietro, Watertown, Mass., assignors to General Foods Corporation, White Plains, N. Y., a corporation of Delaware No Drawing. Application April 21, 1955,
Serial No. 503,019

3 Claims. (Cl. 99—23)

The present invention relates to improved confectioners coatings of the chocolate type and more particularly such coating having increased resistance to deterioration and off-flavor development.

With the great increase in the price of cacao that has occurred in recent years the chocolate industry has been forced to an ever-increasing degree to the production of artificial chocolate materials. These efforts have largely centered on the substitution of cocoa butter with less expensive vegetable fats modified by hydrogenation, fractionation, and the like to provide physical properties, with particular regard to melting characteristics, very similar to those of cocoa butter. Difficulty has been experienced with such artificial chocolate coatings in the development of musty off-flavors, sometimes described also as "soapiness."

It has been found that this deterioration is accelerated when the artificial chocolate materials are subjected to high humidities and temperatures. Also, fats in which a relatively high proportion of the fatty acid combined with the glycerol is lauric acid are especially subject to such deterioration. While such fats by themselves are not particularly prone to deteriorate, mixture of the fat with cocoa powder renders the fat subject to deterioration. Apparently the cocoa butter normally associated with the cocoa powder is relatively resistant to the deterioration while other vegetable fats, especially those with high proportions of the lauric acid residue in the triglyceride structure, such as coconut oil and palm kernel oil, are much less resistant.

It has now been found that the above-described deterioration of fat when associated with cocoa powder can be greatly retarded and for all practical purposes prevented by incorporating sorbic acid into the vegetable fat-cocoa powder mixture. Sorbic acid has the following formula:

$$CH_3CH=CHCH=CHCOOH$$

The sorbic acid is employed at low levels, a level of about 0.2% being preferred. Lower levels of sorbic acid may be employed with less effective protection. Higher levels are not usually employed because generally additional protection is not needed as a practical matter. Also, the levels above 0.2% sorbic acid do not provide proportionately increased protection.

While the need for sorbic acid is most pronounced with other vegetable fats and oils when admixed with cocoa powder, it is also beneficial with cocoa butter-cocoa powder mixtures, e. g., chocolate liquor, bitter, sweet and milk chocolate, and the like.

The sorbic acid may be incorporated into the vegetable fat-cocoa powder mixture in any suitable manner as by dissolving the sorbic acid in the melted vegetable fat which is most conveniently done at the time of admixing the cocoa powder and other ingredients such as sugar, milk solids and like chocolate ingredients. The sorbic acid may be premixed with the cocoa powder, milk solids and/or sugar before incorporation into the fat. Also, the sorbic acid may be applied to the surface of the vegetable fat-cocoa powder product although this provides less effective protection and is less practical being limited essentially to treatment of the final product.

While the invention has been described above with reference to sorbic acid, it is intended to include sorbic acid salts and esters. Such salts include the non-toxic salts such as those of sodium, potassium, calcium, and the like while such esters include the simple aliphatic esters such as ethyl, methyl, propyl, butyl, cyclohexyl, allyl, and the like.

While the invention has been described above with reference to specific examples, it is not to be limited thereby but reference is to be had to the appended claims for a definition of its scope.

While definition of the invention or the scope of the appended claims is not to be restricted by theoretical considerations, it will be understood that the aforementioned deterioration of the confectioners coating, whether cocoa butter or other vegetable fat is employed, is believed due for the most part to the development of free lauric acid giving rise to the off-flavors described as mustiness, soapiness, and the like.

What is claimed is:

1. A confectioners coating comprising a vegetable fat, cocoa powder and a member of the group consisting of sorbic acid, its non-toxic salts and its simple aliphatic esters, said member being present in an amount effective to prevent substantially the development of off-flavors in said coating.

2. A confectioners coating comprising a vegetable fat in which a relatively high proportion of the fatty acid combined with the glycerol is lauric acid, cocoa powder and a member of the group consisting of sorbic acid, its non-toxic salts and its simple aliphatic esters, said member being present in an amount effective to prevent substantially the development of off-flavors in said coating.

3. A confectioners coating comprising a vegetable fat in which a relatively high proportion of the fatty acid combined with the glycerol is lauric acid, cocoa powder and a member of the group consisting of sorbic acid, its non-toxic salts and its simple aliphatic esters at a level of about 0.2%.

References Cited in the file of this patent
UNITED STATES PATENTS 2,586,615    Cross _____ Feb. 19, 1952

OTHER REFERENCES

"Food Technology," 1951, vol. V, No. 7, pages 288–290.

"Modern Packaging," December 1953, pages 139–141, 184.